No. 726,629. PATENTED APR. 28, 1903.
W. E. BROWN.
JAR CLOSURE.
APPLICATION FILED DEC. 17, 1902.
NO MODEL.
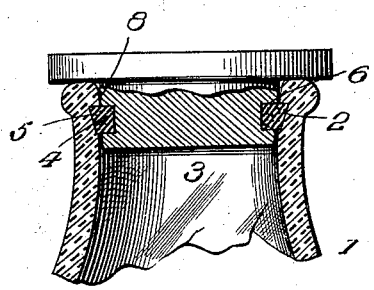
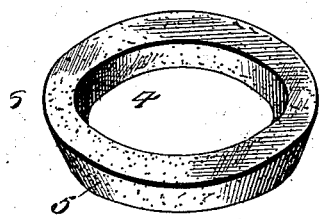
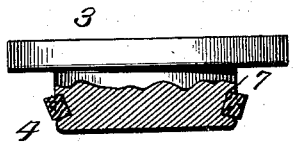
Inventor
W. E. Brown
Witnesses
Attorney

United States Patent Office.

WILLIAM E. BROWN, OF LOS ANGELES, CALIFORNIA, ASSIGNOR TO B-W AUTOMATIC JAR & BOTTLE COMPANY, OF LOS ANGELES, CALIFORNIA, A CORPORATION OF CALIFORNIA.

JAR-CLOSURE.

SPECIFICATION forming part of Letters Patent No. 726,629, dated April 28, 1903.

Application filed December 17, 1902. Serial No. 135,626. (No model.)

*To all whom it may concern:*

Be it known that I, WILLIAM E. BROWN, of Los Angeles, in the county of Los Angeles and State of California, have invented certain new and useful Improvements in Jar-Closures; and I do hereby declare the following to be a full, clear, and exact description of the invention, such as will enable others skilled in the art to which it appertains to make and use the same.

The object of this invention is to so form or arrange the sealing-ring or gasket of a jar or bottle closure that in forcing the latter home the gasket will spring into a groove or recess in the neck of the jar or bottle and not only serve to keep the contents air-tight, but also prevent the accidental loosening or removal of the stopper or closure.

A further object is to so form or arrange the gasket as to require a twisting action on the stopper to effect the disengagement of the gasket from the retaining-groove.

The invention will be hereinafter fully set forth, and particularly pointed out in the claims.

In the accompanying drawings, Figure 1 is a vertical sectional view of portion of a bottle-neck with the stopper seated therein, the latter provided with a gasket in accordance with my invention. Fig. 2 is an enlarged detail view of the gasket. Fig. 3 shows a slight modification.

Referring to the drawings, 1 designates a jar or bottle in the neck of which is formed an inner annular groove or recess 2, the same being a short distance from the edge of the neck. The side wall of the groove is beveled, so that there will be greater depth at the top than at the bottom, the top and bottom walls being flat or horizontal.

In a circumferential groove in the stopper 3 is a ring or gasket 4, preferably of rubber. This gasket is of peculiar formation—that is, its outer surface 5 is tapered downwardly and inwardly, the upper edge forming an approximately horizontal shoulder 6 at right angles to the neck of the stopper, while the lower edge projects to less extent. The projecting portion of the gasket conforms to groove 2.

When the stopper is inserted within the neck of the jar, the gasket will give and expand upwardly under engagement with the wall of the neck; but when the gasket comes into line with the groove 2 it will at at once spring or snap thereinto under the resiliency of the rubber, and the upper edge or shoulder will so contact with the groove that the stopper can only be removed by a twisting action thereon similar to the extraction by hand of a cork from a bottle.

In lieu of tapering the outer face of the gasket substantially the same results may be obtained by providing the stopper with a tapered groove 7, as shown in Fig. 3. This causes the upper edge of the gasket to project outward, producing an extended ledge, the same as when the outer face of the gasket is beveled.

In order to insure the free passage of the gasket in the insertion of the stopper, the latter or the neck of the jar, or both, are moistened. For this purpose I preferably use liquid paraffin, although water will suffice. By the use of paraffin the closure is rendered absolutely air-tight, all the crevices being filled thereby. I have indicated the paraffin at 8 in Fig. 1.

In order to remove the stopper, it is necessary to twist the same until the shoulder edge of the gasket works free of the groove, whereupon the stopper may be readily withdrawn.

It will be seen that I have provided very simple and inexpensive means for automatically locking a stopper in a jar and preserving the contents of the latter perfectly air-tight.

I claim as my invention—

1. A jar or other vessel having a groove in its neck, a stopper, and a gasket on such stopper for entering said groove as the stopper is forced home, such gasket normally projecting from said stopper to a greater extent at the top than at the bottom, as set forth.

2. The combination with a jar or other vessel having a groove in its neck, such groove being deeper at the top than at the bottom and having flat top and bottom walls, of a stopper and a gasket carried by such stopper designed to be accommodated by said groove and having a projecting portion of size and formation corresponding to the groove of the jar.

3. A jar or other vessel having a groove in its neck, a stopper, and a gasket on such stopper for entering said groove as the stopper is forced home, such gasket being tapered on its outer surface, its upper edge forming a shoulder at approximately right angles to the stopper, as set forth.

4. A jar or other vessel having a groove in its neck, a stopper, and a gasket on such stopper for entering said groove as the stopper is forced home, such gasket being tapered on its outer surface, its upper edge forming a shoulder at approximately right angles to the stopper, and a coating of paraffin, or its equivalent, between the stopper, the gasket, and the neck of the vessel, as set forth.

In testimony whereof I have signed this specification in the presence of two subscribing witnesses.

WILLIAM E. BROWN.

Witnesses:
GRAFTON L. McGILL,
F. S. MAGUIRE.